United States Patent
Okishima et al.

(10) Patent No.: US 10,597,038 B2
(45) Date of Patent: Mar. 24, 2020

(54) CONTROL METHOD AND CONTROL DEVICE FOR ENGINE

(71) Applicant: Nissan Motor Co., Ltd., Kanagawa (JP)

(72) Inventors: Masafumi Okishima, Kanagawa (JP); Shingo Yamanaka, Kanagawa (JP); Ryuji Watanabe, Kanagawa (JP); Manabu Okamura, Kanagawa (JP); Kenichi Tsubaki, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/333,854

(22) PCT Filed: Sep. 16, 2016

(86) PCT No.: PCT/JP2016/077569
§ 371 (c)(1),
(2) Date: Mar. 15, 2019

(87) PCT Pub. No.: WO2018/051513
PCT Pub. Date: Mar. 22, 2018

(65) Prior Publication Data
US 2019/0256100 A1    Aug. 22, 2019

(51) Int. Cl.
*B60W 30/20* (2006.01)
*F02D 41/02* (2006.01)
(Continued)

(52) U.S. Cl.
CPC ............ *B60W 30/20* (2013.01); *B60W 30/02* (2013.01); *F02D 17/02* (2013.01); *F02D 37/02* (2013.01);
(Continued)

(58) Field of Classification Search
USPC ........................................................ 701/70
See application file for complete search history.

(56) References Cited

U.S. PATENT DOCUMENTS

| | | | |
|---|---|---|---|
| 5,597,371 A | 1/1997 | Toukura | |
| 6,820,593 B2 * | 11/2004 | Remele | F02D 41/0085 123/436 |
| 7,438,042 B1 * | 10/2008 | Kawada | B60K 6/445 123/198 B |
| 2003/0089338 A1 * | 5/2003 | Remele | F02D 41/0085 123/436 |

(Continued)

FOREIGN PATENT DOCUMENTS

| | | |
|---|---|---|
| JP | H07-293649 A | 11/1995 |
| JP | H08-177564 A | 7/1996 |

(Continued)

*Primary Examiner* — Tyler D Paige
(74) *Attorney, Agent, or Firm* — Osha Liang LLP

(57) ABSTRACT

A control method for an engine includes determining whether a predetermined fuel supply stop condition has been fulfilled, executing stop time vibration suppression control of, after stop of fuel supply in response to fulfillment of the predetermined fuel supply stop condition, temporarily performing fuel supply to the engine to suppress vehicle vibration, and stopping fuel supply to all cylinders after the execution of the stop time vibration suppression control. The stop time vibration suppression control includes determining whether a first predetermined number of cylinders have undergone a combustion stroke after the stop of the fuel supply, the first predetermined number being according to a engine revolution speed or a reduction ratio from the engine to drive wheels, and in a case where the first predetermined number of cylinders have undergone the combustion stroke, performing fuel supply to a second predetermined number of cylinders.

11 Claims, 14 Drawing Sheets

(51) Int. Cl.
*F02D 37/02* (2006.01)
*B60W 30/02* (2012.01)
*F02D 17/02* (2006.01)
*F02D 41/30* (2006.01)
*F02D 41/12* (2006.01)

(52) U.S. Cl.
CPC ....... *F02D 41/0225* (2013.01); *F02D 41/123* (2013.01); *F02D 41/30* (2013.01); *B60W 2540/10* (2013.01); *B60W 2710/0644* (2013.01); *F02D 41/126* (2013.01); *F02D 2200/101* (2013.01); *F02D 2250/21* (2013.01); *F02D 2700/02* (2013.01); *F02D 2700/056* (2013.01)

(56) References Cited

U.S. PATENT DOCUMENTS

| | | | | |
|---|---|---|---|---|
| 2007/0101965 | A1* | 5/2007 | Asahara | B60K 6/442 123/192.1 |
| 2007/0254772 | A1* | 11/2007 | Satou | F02D 41/123 477/107 |
| 2015/0252742 | A1* | 9/2015 | Stroh | F02D 41/0085 60/274 |
| 2016/0252069 | A1* | 9/2016 | Teraya | B60W 20/00 701/22 |

FOREIGN PATENT DOCUMENTS

| | | |
|---|---|---|
| JP | H08-177566 A | 7/1996 |
| JP | 2000-110612 A | 4/2000 |
| JP | 2002-364406 A | 12/2002 |
| JP | 2007-120404 A | 5/2007 |

\* cited by examiner

CONTROL METHOD AND CONTROL DEVICE FOR ENGINE

BACKGROUND

Technical Field

The present invention relates to a control device and a control method for an engine which suppress vibration occurring in a vehicle at a time of stopping, and at a time of subsequently restarting, fuel supply to the engine.

Related Art

It is known, at a time of stopping fuel supply to an engine, to use an engine torque to cancel the vibration occurring in the vehicle due to the stop of the fuel supply, to suppress the torque shock.

JP08-177566A describes a technique with which, when an accelerator pedal is fully released and fuel supply to the engine is to be stopped, a fuel injection pattern set in advance so as to cancel the vibration occurring in the vehicle is read, and the fuel injection valves are driven in accordance with the pattern to thereby produce an engine torque. Specifically, information on whether to execute or inhibit fuel injection to a cylinder that is to undergo a combustion stroke next is read from the fuel injection pattern (FCTPTN). With a flag (C) value being set to "1" when executing fuel injection and "0" when inhibiting fuel injection, the fuel injection is executed for the cylinder for which the flag (C) value has been set to "1", while the fuel injection is inhibited for the cylinder for which the value has been set to "0". Such a control is repeated for every cylinder that is about to undergo a combustion stroke. At a point in time when a period determined by a control counter has elapsed, the control based on the fuel injection pattern is finished, and fuel supply to all the cylinders is stopped.

SUMMARY OF INVENTION

However, according to the control that invariably applies a preset fuel injection pattern, it would be difficult to reliably suppress the torque shock when the engine revolution speed or the transmission reduction ratio is different from the reference setting. This is because while the time resolution with which the engine torque can be controlled is determined by the combustion interval, the combustion interval (time) varies depending on the engine revolution speed, and on the other hand, torsional vibration occurring in the drive train in conjunction with the engine torque fluctuation varies depending on the transmission reduction ratio.

Further, the torque shock occurs, not only when stopping fuel supply, but also when, following the stop of fuel supply to the engine, restarting the fuel supply in response to accelerator pedal depression or the like. JP08-177566A has no mention of such a torque shock at a restart time.

One or more embodiments of the present invention more reliably suppresses a torque shock at a time of stopping, and at a time of subsequently restarting, fuel supply to the engine.

One or more embodiments of the present invention provides a control method for an engine.

In one or more embodiments of the present invention, it is determined whether a predetermined fuel supply stop condition has been fulfilled; stop time vibration suppression control of, after stop of fuel supply in response to fulfillment of the predetermined fuel supply stop condition, temporarily performing fuel supply to the engine to suppress vehicle vibration is executed; and fuel supply to all cylinders is stopped after the execution of the stop time vibration suppression control. Here, in the stop time vibration suppression control, it is determined whether a first predetermined number of cylinders have undergone a combustion stroke after the stop of the fuel supply, the first predetermined number being according to an engine revolution speed or a reduction ratio from the engine to drive wheels, and in a case where the first predetermined number of cylinders have undergone the combustion stroke, fuel supply to a second predetermined number of cylinders is performed. The first predetermined number is increased as the engine revolution speed is higher, and increased as the reduction ratio from the engine to the drive wheels is higher.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

(System Overall Configuration)

Figure 1:
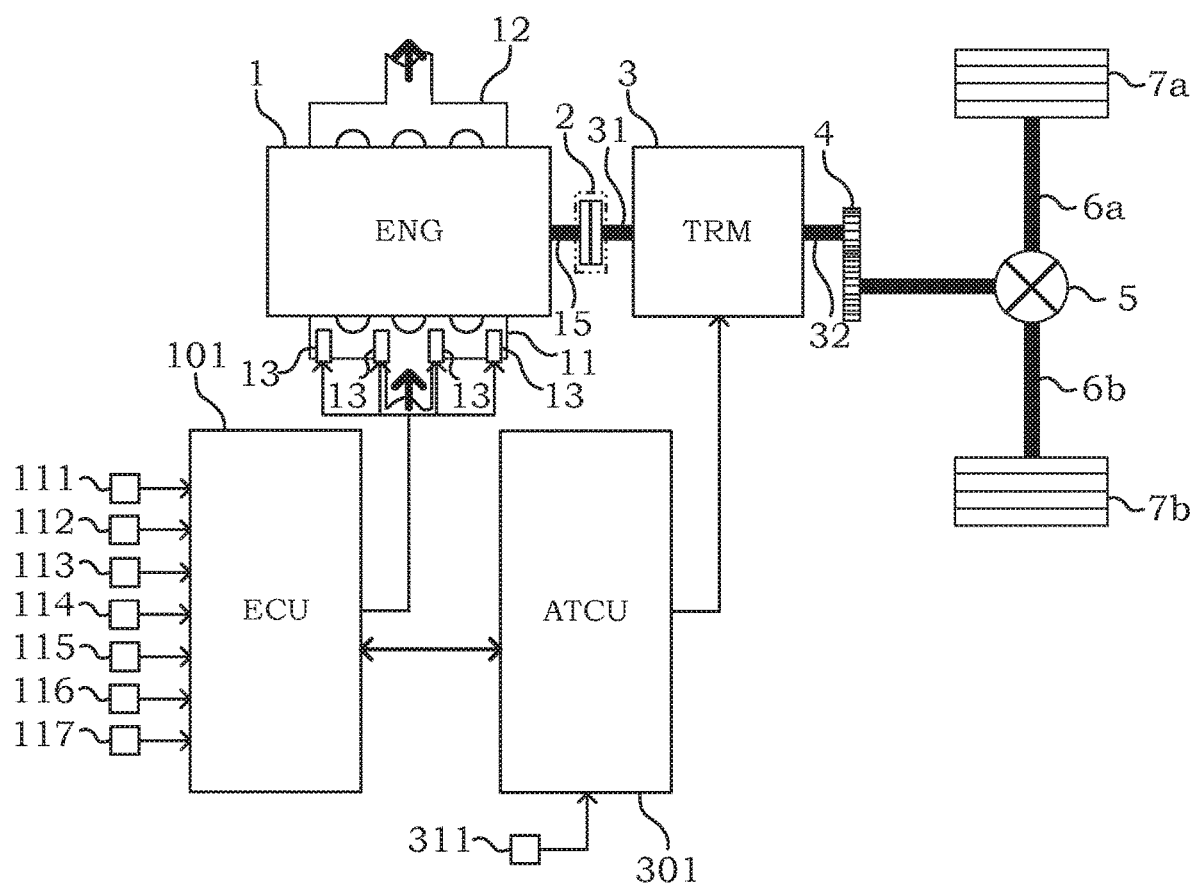
FIG. 1 is a schematic overall configuration diagram of a vehicle drive system including an engine according to an embodiment of the present invention.

FIG. 1 shows an overall configuration of a vehicle drive system that includes an internal combustion engine (hereinafter, referred to as "engine") 1 according to a first embodiment of the present invention.

In the first embodiment, the engine 1 constitutes a vehicle drive source. A torque generated by the engine 1 is transmitted via a transmission 3 (described later), a final gear 4, and a differential gear 5, to drive shafts 6a, 6b, thereby rotating drive wheels 7a, 7b. While a continuously variable transmission is adopted as the transmission 3 in the first embodiment, not limited thereto, a stepped transmission may be adopted as well.

The engine 1 includes an intake passage 11 and an exhaust passage 12. The air is sucked into the cylinders via the intake passage 11, and the exhaust gas generated by combustion within the cylinders is discharged to the outside via the exhaust passage 12. In the first embodiment, the engine 1 includes fuel injection valves 13 at a port of the intake passage 11, and air-fuel mixture of the air and the fuel injected by the fuel injection valves 13 is sucked into the cylinders. The fuel injection valves 13 are not limited to those which inject fuel to the port of the intake passage 11; they may be ones that inject fuel directly into the cylinders. A spark plug (not shown) is provided for each cylinder, at a cylinder head of the engine 1, and the air-fuel mixture sucked in the cylinder is ignited by this spark plug.

The engine 1 has a crankshaft 15 connected to an input shaft (hereinafter, referred to as "transmission input shaft") 31 of the transmission 3 via a clutch 2. The transmission 3 includes, as shift control elements, an input side pulley, an output side pulley, and a metal belt suspended between the pulleys. A ratio between the metal belt winding diameter on the input side pulley and that on the output side pulley can be changed so as to change the reduction ratio. The clutch 2 is a torque converter lock-up clutch. The transmission 3 has an output shaft (hereinafter, referred to as "transmission output shaft") 32 connected to the drive shafts 6a, 6b via the final gear 4 and the differential gear 5. The output torque (engine torque) of the engine 1 transmitted via the transmission 3 and the final gear 4 to the drive shafts 6a, 6b causes the drive wheels 7a, 7b to rotate, to let the vehicle move forward.

(Control System Configuration)

The operation of the engine 1 is controlled by an engine controller 101.

The engine controller 101 is constituted as an electronic control unit, which includes a central processing unit (CPU), storage devices such as ROM and RAM, and an input/output interface.

The engine controller 101 inputs, as the operating states of the engine 1, detection signals of an accelerator sensor 111, a revolution speed sensor 112, and a coolant temperature sensor 113, and also inputs detection signals of an air flow meter 114, a vehicle speed sensor 115, and an air-fuel ratio sensor 116.

The accelerator sensor 111 detects a driver's accelerator pedal depression amount (hereinafter, referred to as "accelerator operation amount") APO. The revolution speed sensor 112 detects a revolution speed NE of the engine 1. As the revolution speed sensor 112, a crank angle sensor may be adopted. A signal output from the crank angle sensor for each unit crank angle or each reference crank angle is converted to the number of revolutions per unit time (hereinafter, referred to as "engine revolution speed"), to detect the revolution speed NE of the engine 1. The coolant temperature sensor 113 detects a temperature TW of engine coolant. Instead of the temperature of the engine coolant, a temperature of engine lubricant oil may be adopted. The air flow meter 114 detects a flow rate of the air sucked into a cylinder, as an intake air quantity Qa. The vehicle speed sensor 115 detects a running speed VSP of the vehicle. The air-fuel ratio sensor 116 detects an air-fuel ratio AF of the exhaust gas. The engine controller 101 sets a fuel injection quantity, an ignition timing, and the like on the basis of the detection signals of the sensors 111 to 116, and outputs a drive signal according to the fuel injection quantity to the fuel injection valves 13, for example, to control the operation of the engine 1.

In the first embodiment, in addition to the above, for performing deceleration fuel cut during traveling, an idle switch 117 is provided which outputs an ON signal when the accelerator is fully closed. The idle switch 117 outputs an ON signal in the state where the accelerator pedal is fully released. The signal from the idle switch 117 is input to the engine controller 101 similarly as the signals from the other sensors. In normal times, the engine controller 101 outputs a drive signal according to the operating states of the engine 1 to the fuel injection valves 13, as explained above. On the other hand, in a case where a predetermined fuel cut condition, including that the engine revolution speed NE is not lower than a predetermined value NEfc, is fulfilled at a time when the accelerator is fully closed, the injection operation of the fuel injection valves 13 is stopped, to stop fuel supply to the engine 1. The deceleration fuel cut is cancelled, following the execution thereof, when the driver depresses the accelerator pedal and the output from the idle switch 117 changes to an OFF signal, or when the engine revolution speed NE decreases to or below a predetermined value NErc with the accelerator pedal remained in the fully released state. After the cancellation of the deceleration fuel cut, the injection operation of the fuel injection valves 13 is restarted, whereby the fuel supply to the engine 1 is restarted.

The engine controller 101 constitutes the "engine controlling unit" according to the first embodiment, and various sensors 111 to 116 including the accelerator sensor 111 and the revolution speed sensor 112 constitute the "engine operating state sensor".

The operation of the transmission 3 is controlled by a transmission controller 301 which is constituted as an electronic control unit similarly as the engine controller 101.

The transmission controller 301 inputs a signal from a revolution speed sensor 311 which detects a revolution speed of the transmission input shaft 31, as well as a signal from an inhibitor switch (not shown) and a signal from a fluid temperature sensor which detects a temperature of transmission hydraulic fluid, and further inputs the accelerator operation amount APO and the vehicle speed VSP via the engine controller 101. On the basis of the detection signals of the sensors, the transmission controller 301 performs computation regarding shift control and the like, and controls the operations of the transmission 3 and the lock-up clutch 2.

Figure 2:
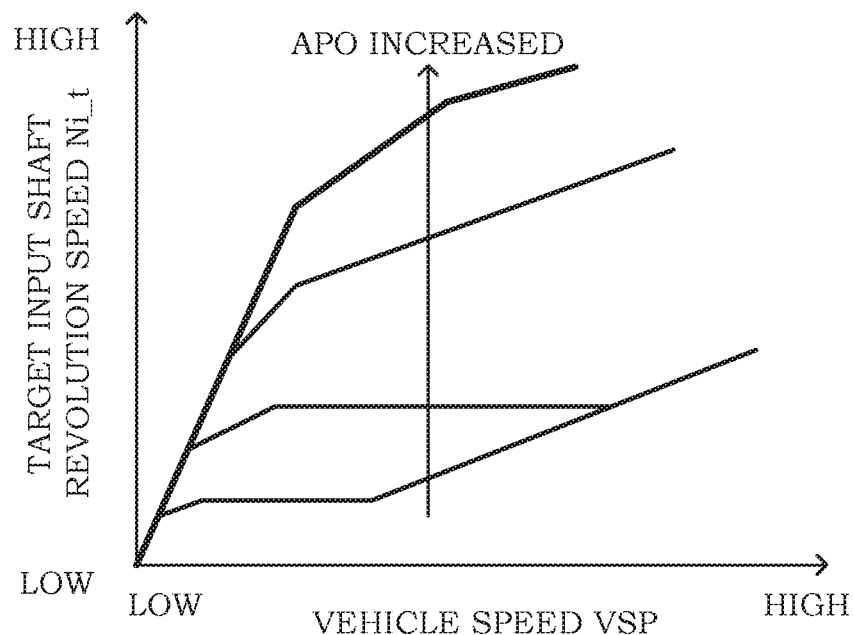
FIG. 2 illustrates a trend of a reduction ratio setting map for a transmission included in the vehicle drive system.
Figure 3:
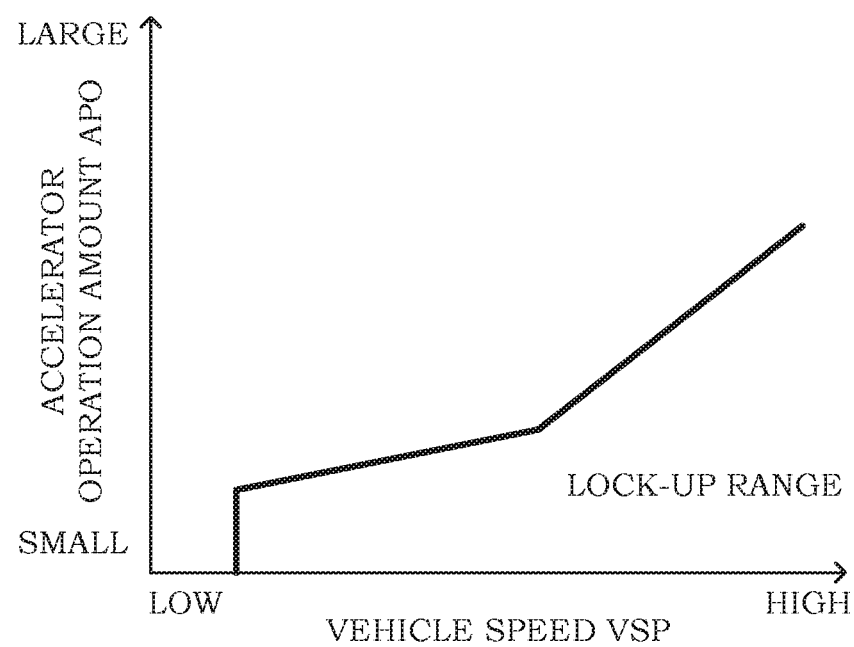
FIG. 3 illustrates a trend of a lock-up range of a torque converter included in the vehicle drive system.

Specifically, the transmission controller 301 refers to the trend map data shown in FIG. 2, on the basis of the accelerator operation amount APO and the vehicle speed VSP, to calculate a target input shaft revolution speed Nit of the transmission 3. The target input shaft revolution speed Ni_t is a target value for the revolution speed (hereinafter, referred to as "input shaft revolution speed") Ni of the transmission input shaft 31, which is set in accordance with the vehicle speed VSP for every accelerator operation amount APO, such that it is increased in response to the increase of the vehicle speed VSP and, with a constant vehicle speed VSP, it is set to a greater value with greater accelerator operation amount APO. The transmission controller 301 controls the reduction ratio of the transmission 3 to cause the input shaft revolution speed Ni detected by the revolution speed sensor 311 to approach the target input shaft revolution speed Ni_t. Further, the transmission controller 301 refers to the trend map data shown in FIG. 3 and, in a case where the vehicle running condition determined by the accelerator operation amount APO and the vehicle speed VSP falls within a lock-up range in the figure, causes the lock-up clutch 2 to be engaged, whereas in a case where it falls within another range, causes the lock-up clutch 2 to be disengaged. In the state where the lock-up clutch 2 is engaged, the crankshaft 15 of the engine 1 and the input shaft 31 of the transmission 3 are mechanically coupled directly to each other.

(Content of Fuel Cut Control)

Fuel cut control for performing deceleration fuel cut will be described with reference to the flowchart shown in FIG. 4.

Figure 4:
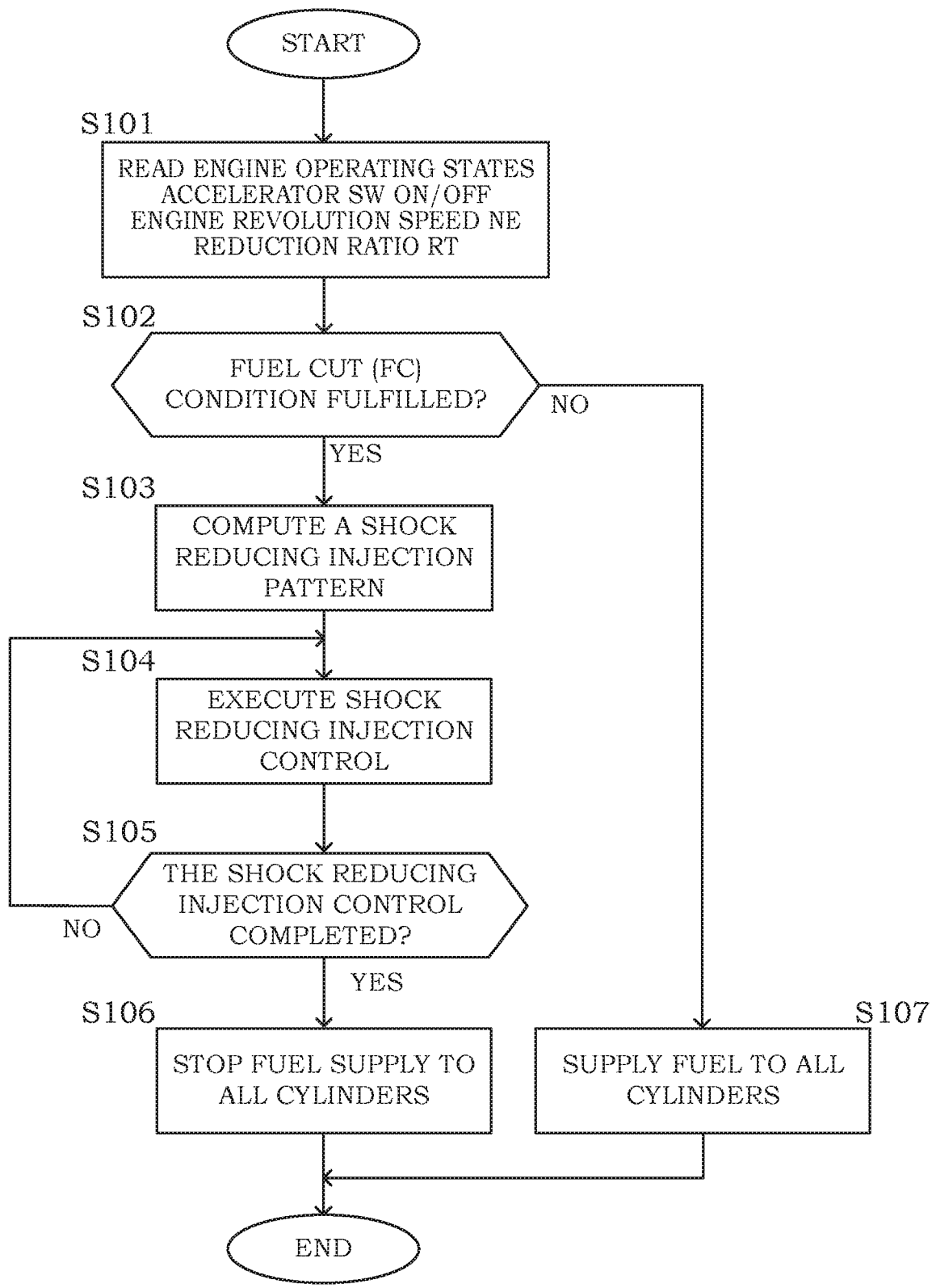
FIG. 4 is a flowchart illustrating a flow of fuel cut control according to an embodiment of the present invention.

In the first embodiment, the control routine shown in FIG. 4 is carried out at certain time intervals after start of the engine 1. In the following description, it is assumed, in performing the deceleration fuel cut, that the vehicle running condition falls within the lock-up range shown in FIG. 3 and that the lock-up clutch 2 is in the engaged state.

In S101, as the operating states of the engine 1, an engine revolution speed NE and a reduction ratio RT are read, and a signal from the idle switch 117 is also read. Here, the reduction ratio RT refers to a reduction ratio over the entire power transmission path from the engine 1 to the drive wheels 7*a*, 7*b*, or more specifically from the crankshaft 15 of the engine 1 to the drive shafts 6*a*, 6*b*, which is obtained as a product (=R1×R2) of a reduction ratio R1 at the transmission 3 and a final reduction ratio R2 at the final gear 4. Although the reduction ratio R1 at the transmission 3 may be set to a target reduction ratio of the transmission 3 and the reduction ratio RT may be obtained as a product of this target reduction ratio and the final reduction ratio R2, in the first embodiment, a value obtained by dividing the revolution speed Ni of the transmission input shaft 31 by a revolution speed No of the drive shafts 6*a*, 6*b* is adopted. The revolution speed No of the drive shafts 6*a*, 6*b* can be obtained from the vehicle speed VSP.

In S102, it is determined whether a predetermined fuel cut condition has been fulfilled. Specifically, it is determined whether the signal from the idle switch 117 is an ON signal and the engine revolution speed NE is not lower than a predetermined value NEfc. If the fuel cut condition is fulfilled, the process proceeds to S103; otherwise, the process proceeds to S107. The fuel cut condition corresponds to the "predetermined fuel supply stop condition". In the first embodiment, the state where the accelerator pedal is fully released is determined by the signal from the idle switch 117. Alternatively, the accelerator sensor 111 may be adopted to detect the state where the accelerator pedal is fully released, with the accelerator operation amount APO being zero or substantially zero.

In S103 to 105, shock reducing injection control at a time of stopping fuel supply (hereinafter, referred to as "stop time shock reducing injection control") is carried out. The stop time shock reducing injection control corresponds to the "stop time vibration suppression control", in which after the stop of fuel supply in response to fulfillment of the fuel cut condition, fuel supply to some of the cylinders is performed to reduce the torque shock due to the torsional vibration in the drive train.

Figure 6:
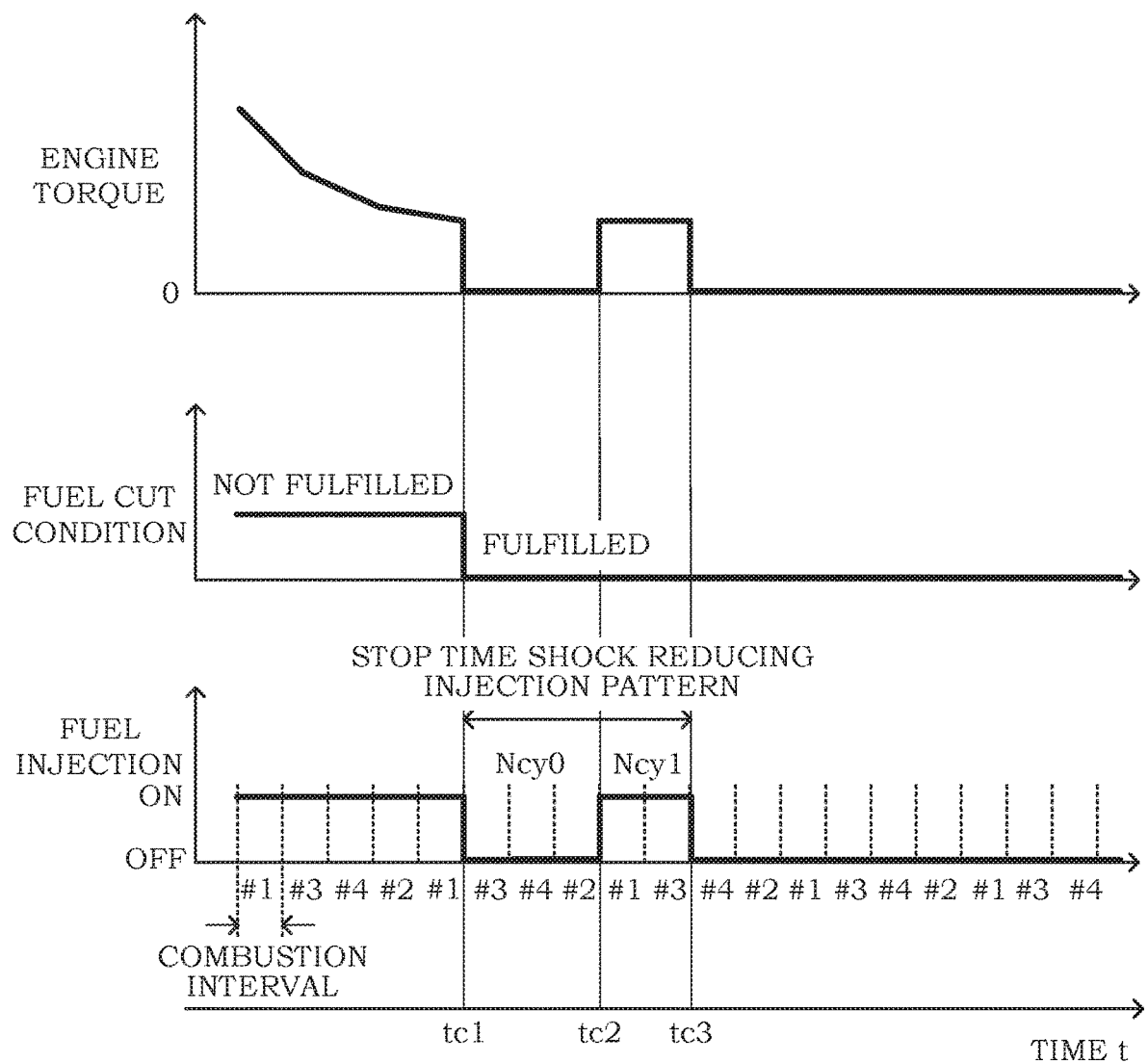
FIG. 6 illustrates a summary of shock reducing injection control in the fuel cut control.

FIG. 6 shows a specific example of a stop time shock reducing injection pattern.

In the first embodiment, the stop time shock reducing injection pattern is set over times tc1 to tc3 where a predetermined number of cylinders undergo a combustion stroke following the time tc1 when the fuel cut condition is fulfilled. According to this pattern, driving of the fuel injection valve 13 is permitted (fuel injection ON) or inhibited (fuel injection OFF). The engine revolution speed NE and the reduction ratio RT at time tc1 are detected, and on the basis of these engine operating states, the number (hereinafter, referred to as "injection stop cylinder number") Ncy0 of cylinders in which driving of the fuel injection valve 13 is inhibited and the number (hereinafter, referred to as "injection execute cylinder number") Ncy1 of cylinders in which driving of the fuel injection valve 13 is permitted are set.

In the example shown in FIG. 6, the injection stop cylinder number Ncy0 is 3 and the injection execute cylinder number Ncy1 is 2. Three consecutive cylinders in order of ignition (third cylinder #3, fourth cylinder #4, and second cylinder #2), led by the third cylinder #3 that is to undergo a combustion stroke next after the time tc1 when the fuel cut condition is fulfilled, are set to be the targets in which driving of the fuel injection valve 13 is inhibited. Further, the targets in which driving of the fuel injection valve 13 is permitted are set to be two consecutive cylinders in order of ignition (first cylinder #1 and third cylinder #3) following the last target cylinder (second cylinder #2) in which driving of the valve was inhibited.

In this manner, after the stop of fuel supply in response to fulfillment of the fuel cut condition (time tc1), driving of the fuel injection valve 13 is permitted in some of the cylinders (first and third cylinders #1 and #3), so that an engine torque is generated temporarily (times tc2 to tc3).

Figure 5A:
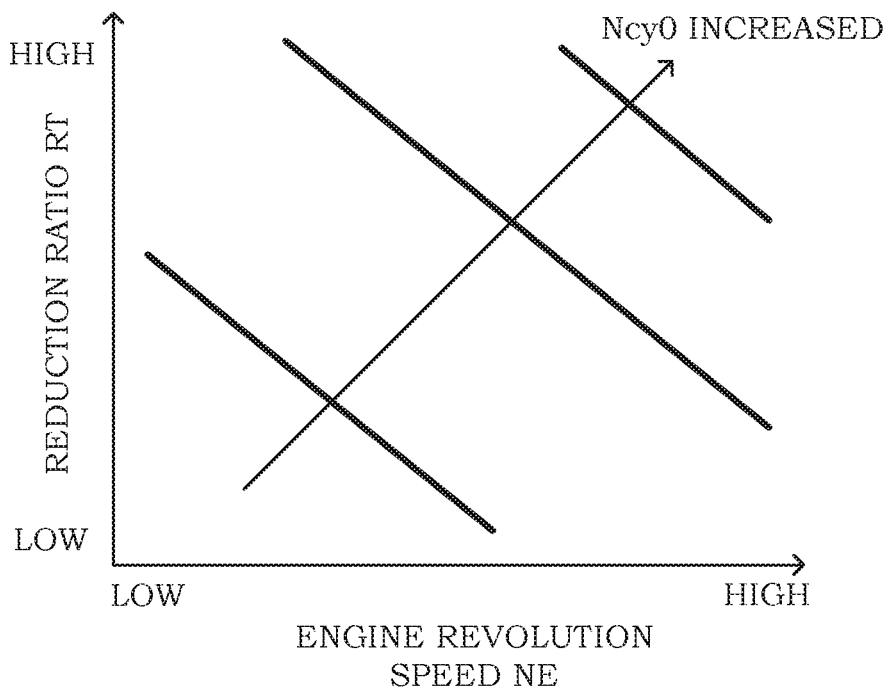
FIG. 5A illustrates a trend of an injection stop cylinder number setting map in the fuel cut control.
Figure 5B:
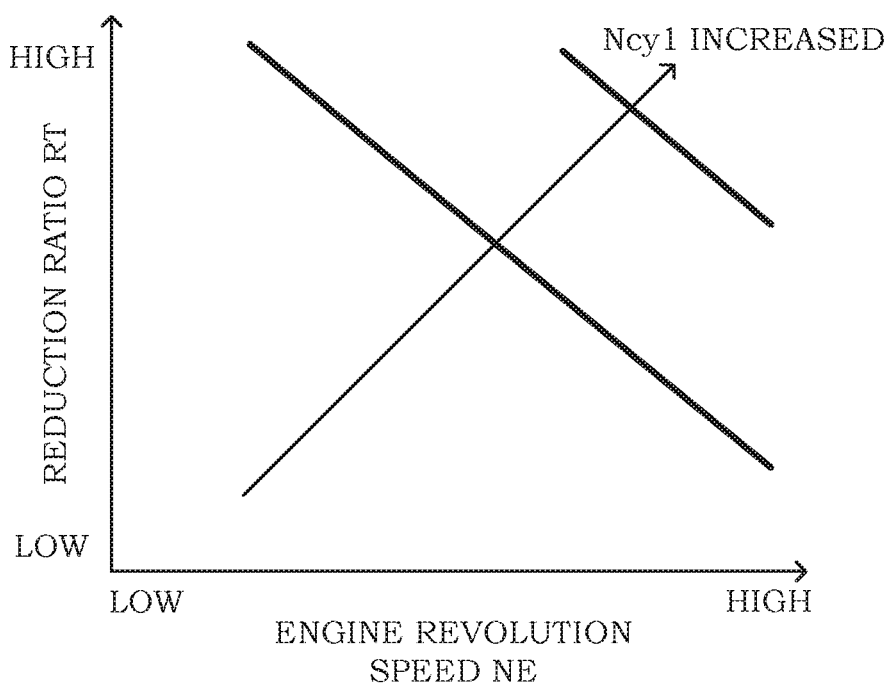
FIG. 5B illustrates a trend of an injection execute cylinder number setting map in the fuel cut control.

Returning to FIG. 4, in S103, a stop time shock reducing injection pattern for reducing the torque shock at a time of stopping fuel supply is computed. Specifically, the injection stop cylinder number Ncy0 and the injection execute cylinder number Ncy1 are computed. Computation of the injection stop cylinder number Ncy0 is performed, on the basis of the engine revolution speed NE and the reduction ratio RT, by referring to the trend map data shown in FIG. 5A. With this computation, the injection stop cylinder number Ncy0 is calculated to be a greater value as the engine revolution speed NE is higher and the reduction ratio RT is higher (in other words, as the gear stage is in a lower speed side). Computation of the injection execute cylinder number Ncy1 is similarly performed, on the basis of the engine revolution speed NE and the reduction ratio RT, by referring to the map data shown in FIG. 5B. The injection execute cylinder number Ncy1 is calculated to be a greater value as the engine revolution speed NE is higher and the reduction ratio RT is higher.

In S104, the fuel injection valves 13 are driven in accordance with the stop time shock reducing injection pattern. In the example shown in FIG. 6, fuel supply to the engine 1 is stopped in response to fulfillment of the fuel cut condition (time tc1), and it is determined whether the cylinders #3, #4, and #2 corresponding to the injection stop cylinder number Ncy0 (=3) arranged in order of ignition, led by the cylinder (third cylinder #3) that undergoes a combustion stroke next after the fulfillment of the fuel cut condition, have undergone a combustion stroke. When these cylinders have undergone the combustion stroke, driving of the fuel injection valve 13 is permitted in the cylinders (#1 and #3) corresponding to the injection execute cylinder number Ncy1 (=2) arranged in order of ignition following the second cylinder #2, to temporarily perform fuel supply to the engine 1.

In S105, it is determined whether the stop time shock reducing injection control has been completed. Specifically, it is determined whether a number of (in the example shown in FIG. 6, five) cylinders, the number being obtained as a sum (=Ncy0+Ncy1) of the injection stop cylinder number Ncy0 and the injection execute cylinder number Ncy1, have undergone a combustion stroke. When the stop time shock reducing injection control is completed, the process proceeds to S106; otherwise, the process returns to S104, and the processing in S104 and 105 described above is repeated.

In S106, driving of the fuel injection valves 13 included in all the cylinders is inhibited, whereby fuel supply to the engine 1 is fully stopped, to complete the fuel cut control.

In S107, normal fuel injection control is executed, in which fuel of the quantity corresponding to the engine operating states is supplied to the engine 1 by the fuel injection valves 13.

In the first embodiment, the processing in S103 to 105 shown in the flowchart in FIG. 4 corresponds to the "stop time vibration suppression control", and the injection stop cylinder number Ncy0 and the injection execute cylinder number Ncy1 correspond respectively to the "first predetermined number" and the "second predetermined number". Further, the processing in S102 shown in the flowchart in FIG. 4 implements the function as the "stop condition determining unit", the processing in S103 to 105 implements the function as the "stop time vibration suppression controlling unit", and the processing in S106 implements the function as the "fuel supply stopping unit".

(Description of Actions and Effects)

The above is the content of the fuel cut control. Effects that may be obtained by the first embodiment will be summarized below.

In the first embodiment, in performing the deceleration fuel cut, the stop time shock reducing injection control is carried out before stopping fuel supply to all the cylinders, to thereby suppress torsional vibration in the drive train due to the fluctuation of the engine torque, and reduce the torque shock.

Figure 7:
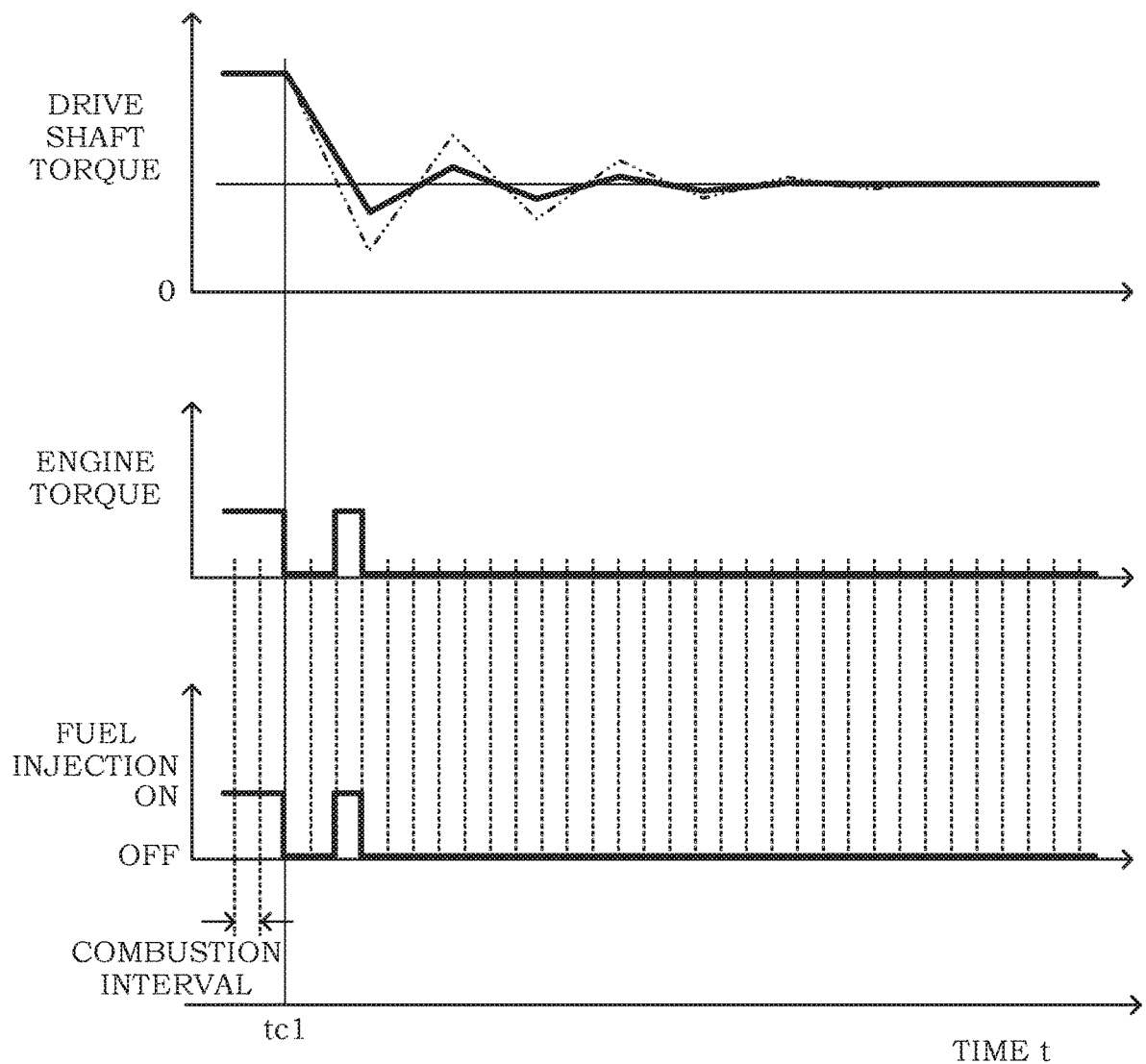
FIG. 7 illustrates an operation of an engine controller concerning the shock reducing injection control under reference conditions.

FIG. 7 shows effects that may be obtained according to the first embodiment under reference conditions (engine revolution speed: NEb1, reduction ratio: RTb1). In FIG. 7, the two-dot-dashed line indicates a drive shaft torque in a case where fuel supply to all the cylinders is stopped immediately after fulfillment of the fuel cut condition (time tc1), without executing the stop time shock reducing injection control, and the solid line indicates the one in a case where the stop time shock reducing injection control is executed.

When fuel supply to the engine 1 is temporarily performed after the stop of fuel supply, by the stop time shock reducing injection control, to generate an engine torque in agreement with the negative peak of the fluctuation occurring in the drive shaft torque, the fluctuation of the drive shaft torque can be suppressed, and the torque shock can be reduced. In the example shown in FIG. 7, for convenience of illustration, the injection stop cylinder number Ncy0 is set to 2 and the injection execute cylinder number Ncy1 is set to 1.

In the first embodiment, it has been configured such that the injection stop cylinder number Ncy0 and the injection execute cylinder number Ncy1 can both be set variably in accordance with the engine revolution speed NE and the reduction ratio RT. Specifically, on the basis of the engine revolution speed NE and the reduction ratio RT at the time of fulfillment of the fuel cut condition, the injection stop cylinder number Ncy0 is set to a greater value as the engine revolution speed NE is higher and the reduction ratio RT is higher, and the injection execute cylinder number Ncy1 is also set to a greater value as the engine revolution speed NE is higher and the reduction ratio RT is higher.

Figure 8:
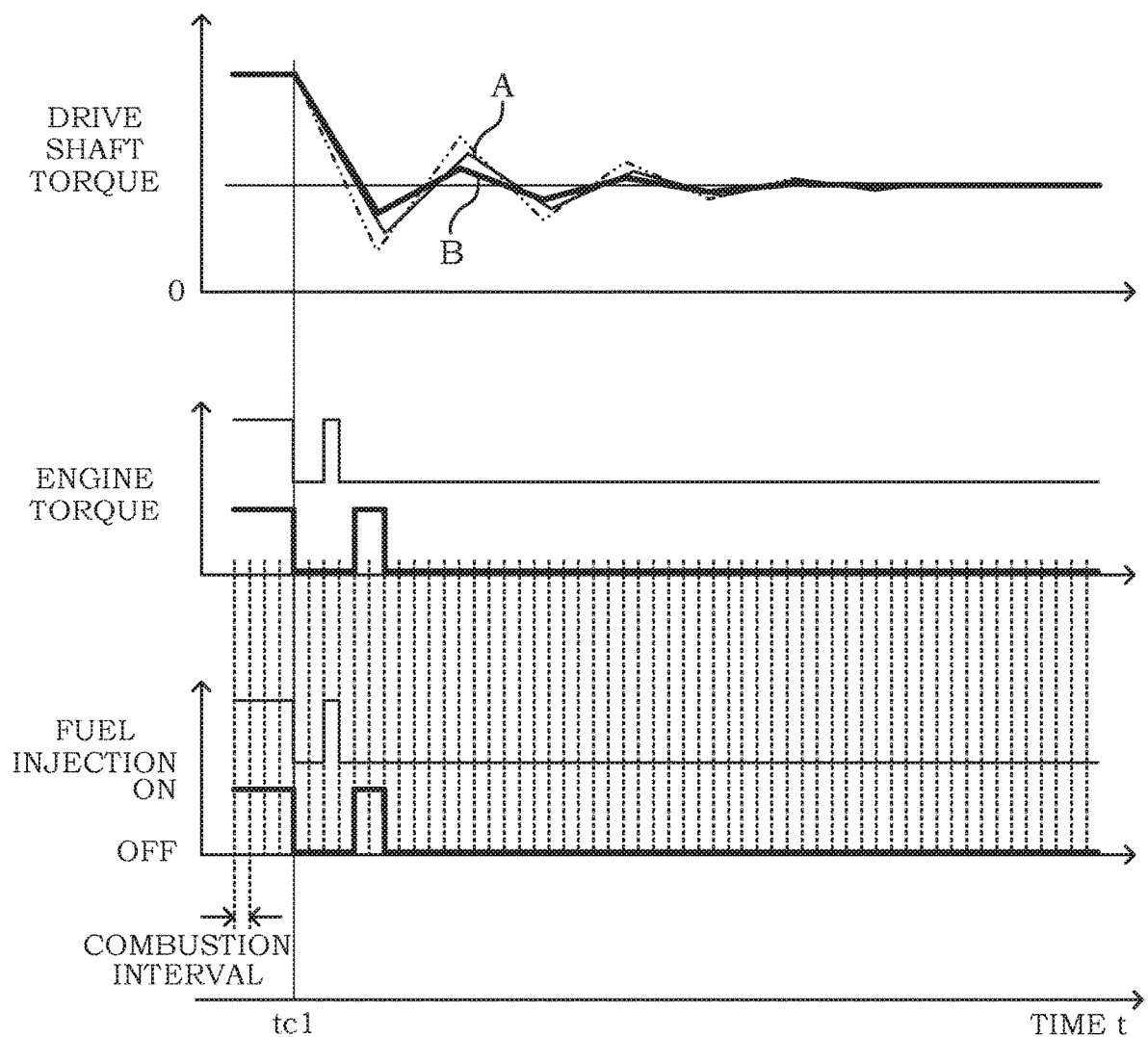
FIG. 8 illustrates an operation of the engine controller concerning the shock reducing injection control when the engine revolution speed is higher than in the reference conditions.

FIG. 8 illustrates a stop time shock reducing injection pattern which is set when the fuel cut condition is fulfilled in a state where the engine revolution speed NE is higher (NE=2×NEb1) than in the reference conditions. Of the two solid lines, the narrow solid line A indicates a change in a case where the injection stop cylinder number Ncy0 and the injection execute cylinder number Ncy1 are set to 2 and 1, respectively, as in the settings in the reference conditions, and the bold solid line B indicates the one in a case where the injection stop cylinder number Ncy0 and the injection execute cylinder number Ncy1 are set in accordance with the engine revolution speed NE. In the example shown in FIG. 8, the injection stop cylinder number Ncy0 and the injection execute cylinder number Ncy1 are both increased (Ncy0=4, Ncy1=2) in response to the increase in the engine revolution speed NE.

The time resolution with which the engine torque can be controlled is determined by the combustion intervals between the cylinders that are consecutive in order of ignition. The combustion interval (time) becomes shorter with increasing engine revolution speed NE. Thus, if the injection stop cylinder number Ncy0 and the injection execute cylinder number Ncy1 are kept at the settings in the reference conditions despite the higher engine revolution speed NE, the engine torque will be generated at a timing earlier than the negative peak in the fluctuation occurring in the drive shaft torque, and further, the engine torque will be generated only during a short period of time as compared to the period in which negative components are formed in the fluctuation of the drive shaft torque.

In contrast, when the injection stop cylinder number Ncy0 and the injection execute cylinder number Ncy1 are increased in response to the increase of the engine revolution speed NE, an engine torque can be generated at an appropriate timing that agrees with the negative peak in the fluctuation occurring in the drive shaft torque, and the engine torque can also be generated over an appropriate period of time with respect to the period in which negative components are formed in the fluctuation of the drive shaft torque. It is therefore possible to more appropriately suppress the fluctuation of the drive shaft torque, and reduce the torque shock.

Figure 9:
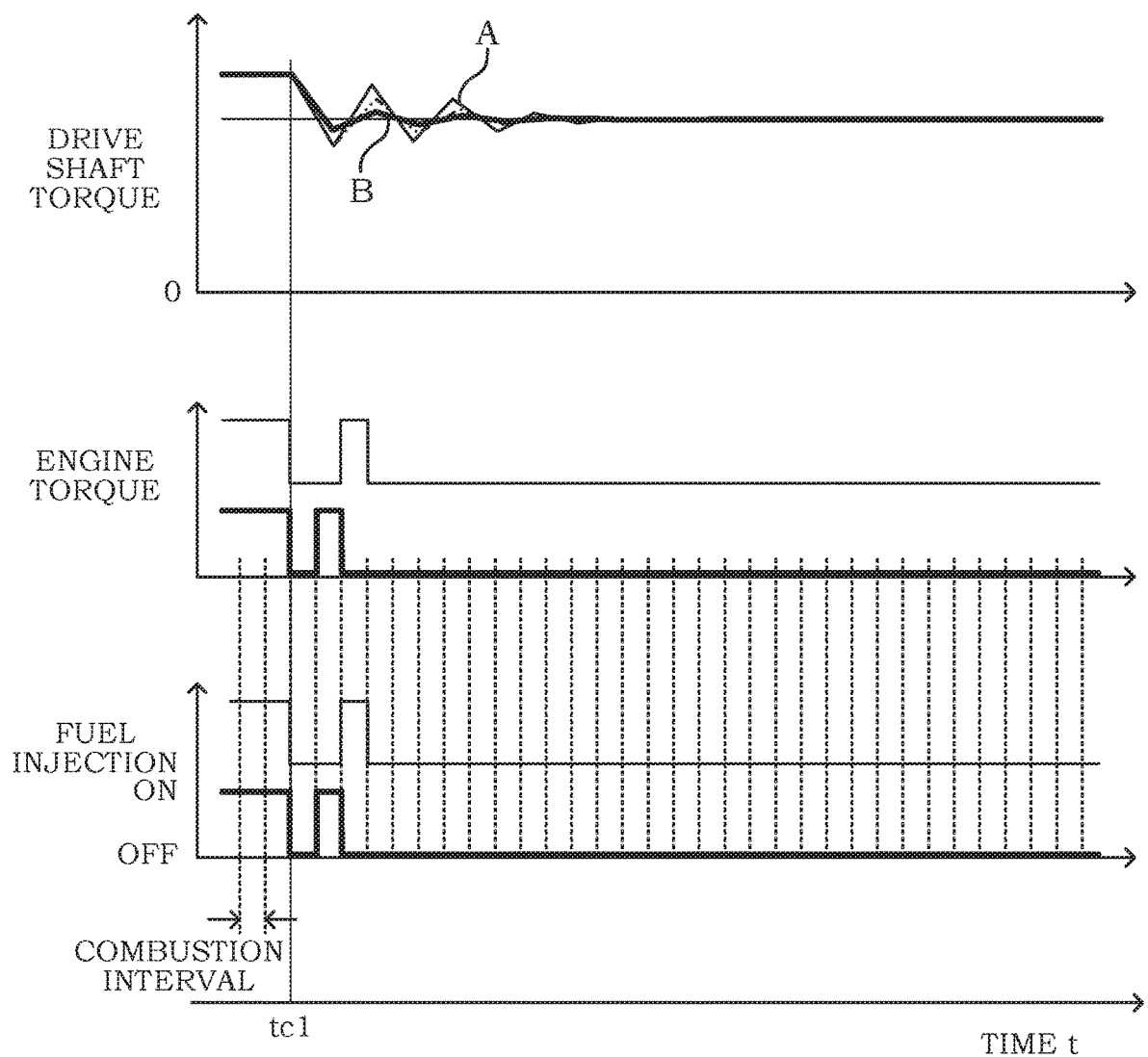
FIG. 9 illustrates an operation of the engine controller concerning the shock reducing injection control when the reduction ratio is lower than in the reference conditions.

FIG. 9 illustrates a stop time shock reducing injection pattern which is set when the fuel cut condition is fulfilled in a state where the reduction ratio RT is lower (RT=RTb1/3) than in the reference conditions. Similarly as in FIG. 8, of the two solid lines, the narrow solid line A indicates a change in a case where the settings in the reference conditions are kept unchanged (Ncy0=2, Ncy1=1), and the bold solid line B indicates the one in a case where the injection stop cylinder number Ncy0 and the injection execute cylinder number Ncy1 are set in accordance with the reduction ratio RT. In the example shown in FIG. 9, while the injection execute cylinder number Ncy1 is kept at the setting in the reference conditions, the injection stop cylinder number Ncy0 is decreased in response to the decrease of the reduction ratio RT (Ncy0=1, Ncy1=1).

The torsional vibration occurring in the drive train due to the engine torque fluctuation varies depending on the reduction ratio RT. With a constant engine revolution speed NE, the cycle of fluctuation of the drive shaft torque becomes shorter as the reduction ratio RT decreases (in other words, as the gear stage is in a higher speed side). Therefore, if the injection stop cylinder number Ncy0 is kept at the setting in the reference conditions despite the lower reduction ratio RT, the engine torque will be generated behind the negative peak in the fluctuation occurring in the drive shaft torque.

In contrast, when the injection stop cylinder number Ncy0 is decreased in response to the decrease of the reduction ratio RT to cause the engine torque to be generated at an earlier timing after the stop of the fuel supply, the engine torque can be generated at an appropriate timing in agreement with the negative peek in the fluctuation occurring in the drive shaft torque.

Further, while the amplitude of the drive shaft torque decreases with decreasing reduction ratio RT, if the injection execute cylinder number Ncy1 is kept at the setting in the reference conditions despite the decreased reduction ratio RT, an excessively large engine torque will be generated, which may rather increase the fluctuation of the drive shaft torque.

In contrast, when the injection execute cylinder number Ncy1 is decreased in response to the decrease of the reduction ratio RT, an engine torque of an appropriate magnitude can be superposed on the drive shaft torque. It is therefore possible to more appropriately suppress the fluctuation of the drive shaft torque, and reduce the torque shock.

Description of Other Embodiments

A second embodiment of the present invention will now be described.

In the second embodiment, fuel cut recovery control of restarting fuel supply to the engine 1 following the execution of the deceleration fuel cut is carried out.

Figure 10:
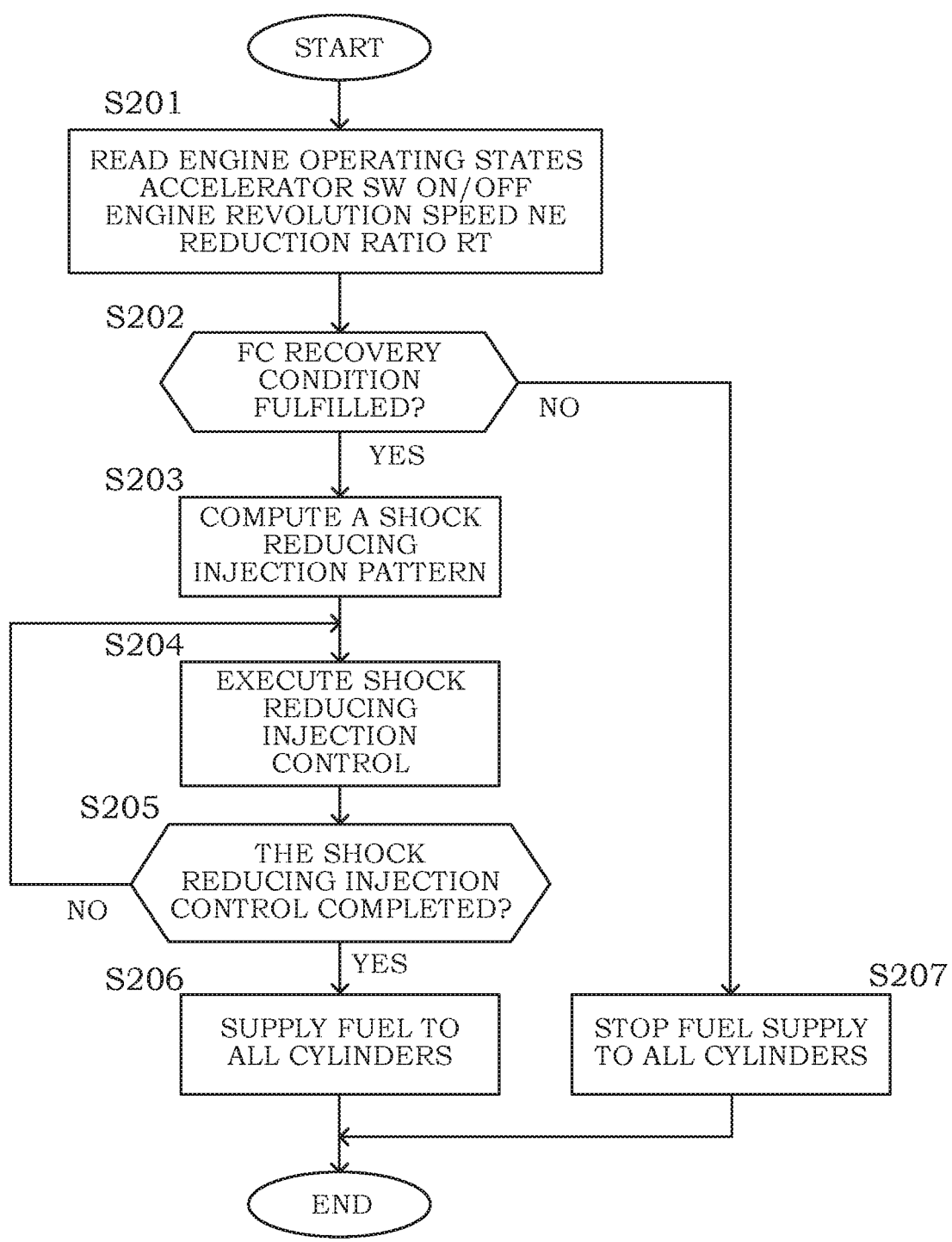
FIG. 10 is a flowchart illustrating a flow of fuel cut recovery control according to another embodiment of the present invention.

FIG. 10 is a flowchart illustrating a flow of the fuel cut recovery control.

In S201, as the operating states of the engine 1, an engine revolution speed NE and a reduction ratio RT are read, and a signal from the idle switch 117 is also read.

In S202, it is determined whether a predetermined fuel cut recovery condition has been fulfilled. Specifically, it is determined whether the signal from the idle switch 117 has been changed from an ON signal to an OFF signal, or the engine revolution speed NE has decreased to or below a predetermined value NErc with the signal from the idle switch 117 still being an ON signal. If the fuel cut recovery condition is fulfilled, the process proceeds to S203; otherwise, the process proceeds to S207. The fuel cut recovery condition corresponds to the "predetermined fuel supply restart condition".

In S203 to 205, shock reducing injection control at a time of restarting fuel supply (hereinafter, referred to as "restart time shock reducing injection control") is carried out. The restart time shock reducing injection control is for reducing the torque shock due to the torsional vibration in the drive train by stopping fuel supply to some of the cylinders following the restart of fuel supply in response to fulfillment of the fuel cut recovery condition.

Figure 12:
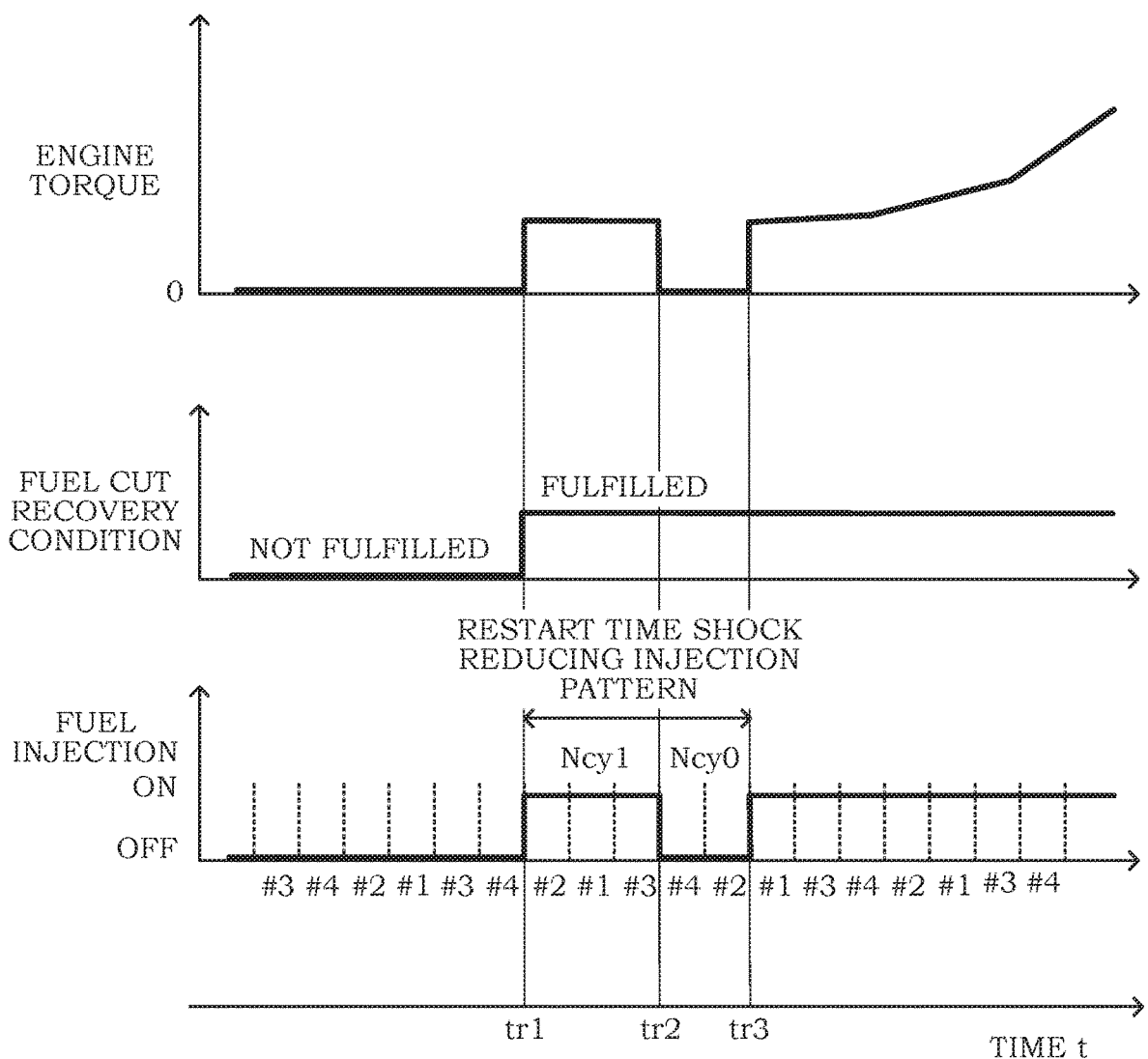
FIG. 12 illustrates a summary of shock reducing injection control in the fuel cut recovery control.

FIG. 12 illustrates a specific example of a restart time shock reducing injection pattern.

In the second embodiment, the restart time shock reducing injection pattern is set over times tr1 to tr3 during which a predetermined number of cylinders undergo a combustion stroke after the time tr1 when the fuel cut recovery condition is fulfilled. Driving of the fuel injection valves 13 is permitted (fuel injection ON) or inhibited (fuel injection OFF) in accordance with this pattern. As in the case of setting the stop time shock reducing injection pattern, the engine revolution speed NE and the reduction ratio RT at time tr1 are detected, and the injection execute cylinder number Ncy1 and the injection stop cylinder number Ncy0 are set on the basis of these engine operating states.

In the example shown in FIG. 12, the injection execute cylinder number Ncy1 is 3, and the injection stop cylinder number Ncy0 is 2. Three consecutive cylinders in order of ignition (second cylinder #2, first cylinder #1, and third cylinder #3), led by the second cylinder #2 that is to undergo a combustion stroke next after the time tr1 when the fuel cut recovery condition is fulfilled, are set to be the targets in which driving of the fuel injection valve 13 is permitted. Further, the targets in which driving of the fuel injection valve 13 is inhibited are set to be two consecutive cylinders in order of ignition (fourth cylinder #4 and second cylinder #2) following the last target cylinder (third cylinder #3) in which driving of the valve was permitted.

In this manner, after the restart of fuel supply in response to fulfillment of the fuel cut recovery condition (time tr1), driving of the fuel injection valve 13 is inhibited in some cylinders (fourth and second cylinders #4, #2), so that the engine torque is reduced temporarily (times tr2 to tr3).

Figure 11A:
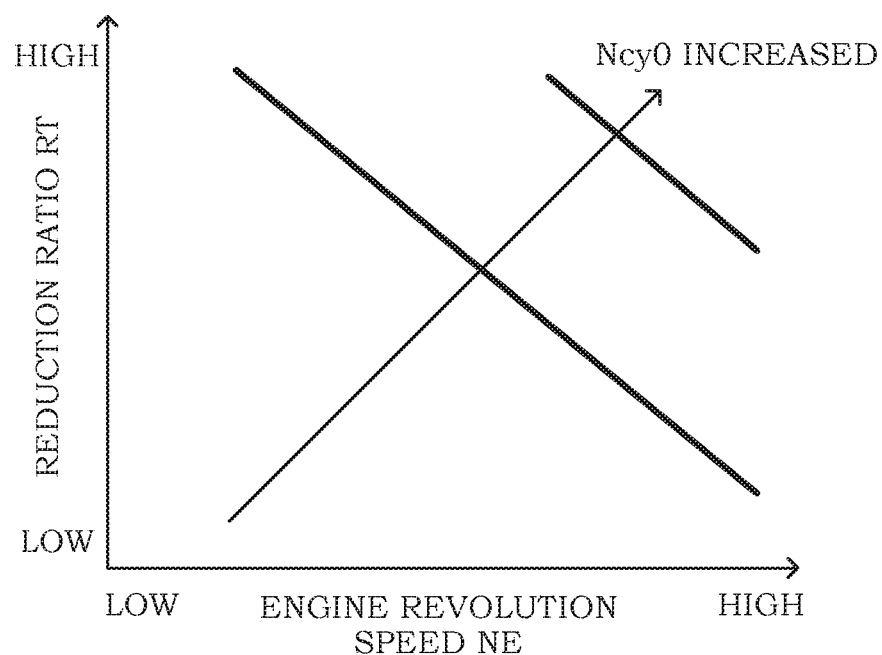
FIG. 11A illustrates a trend of an injection stop cylinder number setting map in the fuel cut recovery control.
Figure 11B:
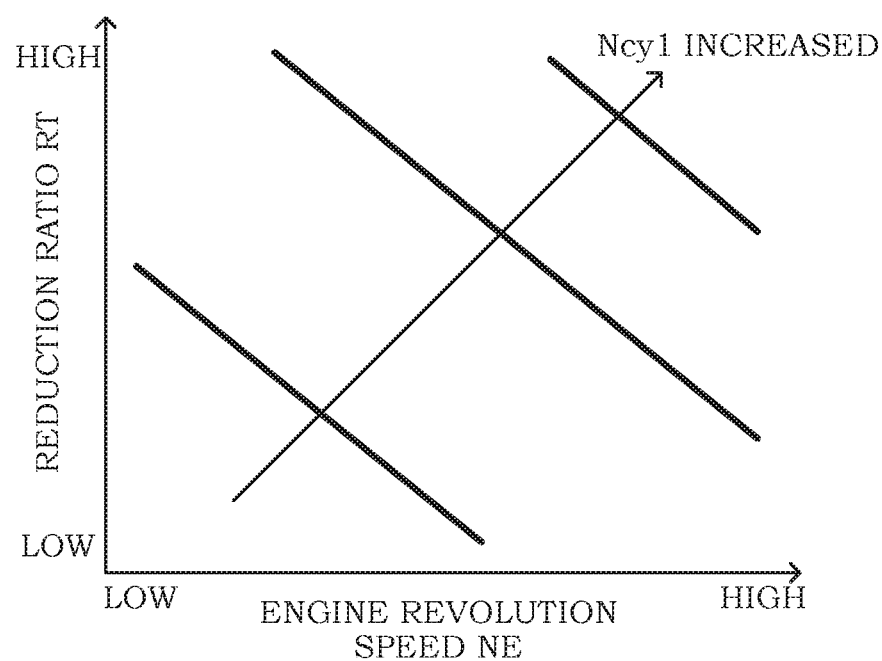
FIG. 11B illustrates a trend of an injection execute cylinder number setting map in the fuel cut recovery control.

Returning to FIG. 10, in S203, a restart time shock reducing injection pattern for reducing the torque shock at the time of restarting fuel supply is computed. Specifically, the injection execute cylinder number Ncy1 and the injection stop cylinder number Ncy0 are computed. Computation of the injection stop cylinder number Ncy0 is carried out by referring to the trend map data shown in FIG. 11A in accordance with the engine revolution speed NE and the reduction ratio RT. With this computation, the injection stop cylinder number Ncy0 is calculated to be a larger value as the engine revolution speed NE is higher and the reduction ratio RT is higher (in other words, as the gear stage is in a lower speed side). Computation of the injection execute cylinder number Ncy1 is similarly carried out by referring to the map data shown in FIG. 11B, in accordance with the engine revolution speed NE and the reduction ratio RT. The injection execute cylinder number Ncy1 is calculated to be a larger value as the engine revolution speed NE is higher and the reduction ratio RT is higher.

In S204, the fuel injection valves 13 are driven in accordance with the restart time shock reducing injection pattern. In the example shown in FIG. 12, fuel supply to the engine 1 is restarted in response to fulfillment of the fuel cut recovery condition (time tr1), and it is determined whether the cylinders #2, #1, and #3 corresponding to the injection execute cylinder number Ncy1 (=3) arranged in order of ignition, led by the cylinder (second cylinder #2) that undergoes a combustion stroke next after the fulfillment of the fuel cut recovery condition, have undergone a combustion stroke, or stated differently, it is determined whether fuel supply to the cylinders corresponding to the injection execute cylinder number Ncy1 has finished. When the fuel supply to these cylinders has finished, driving of the fuel injection valve 13 is inhibited in the cylinders (#4 and #2) corresponding to the injection stop cylinder number Ncy0

(=2) arranged in order of ignition following the third cylinder #3, to temporarily stop fuel supply to the engine 1.

In step S205, it is determined whether the restart time shock reducing injection control has been completed. Specifically, it is determined whether a number of (in the example shown in FIG. 12, five) cylinders, the number being obtained as a sum (=Ncy1+Ncy0) of the injection execute cylinder number Ncy1 and the injection stop cylinder number Ncy0, have undergone a combustion stroke. When the restart time shock reducing injection control is completed, the process proceeds to S206; otherwise, the process returns to S204, and the processing in S204 and 205 explained above is repeated.

In S206, driving of the fuel injection valves 13 included in all the cylinders is permitted, to resume the fuel supply to the engine 1. The fuel cut recovery control is thus completed.

In S207, the deceleration fuel cut is continued, with the fuel supply to the engine 1 being stopped.

In the second embodiment, the injection execute cylinder number Ncy1 and the injection stop cylinder number Ncy0 correspond to the "third predetermined number" and the "fourth predetermined number", respectively. Further, the processing in S202 shown in the flowchart in FIG. 10 implements the function as the "restart condition determining unit", and the processing in S203 to 205 implements the function as the "restart time vibration suppression controlling unit".

The above is the content of the fuel cut recovery control. Effects that may be obtained by the second embodiment will be summarized below.

In the second embodiment, in restarting fuel supply by the fuel cut recovery control, the restart time shock reducing injection control is carried out after the restart of fuel supply, to temporarily stop the fuel supply to the engine 1, to thereby suppress the torsional vibration in the drive train due to the fluctuation of the engine torque, and reduce the torque shock.

Figure 13:
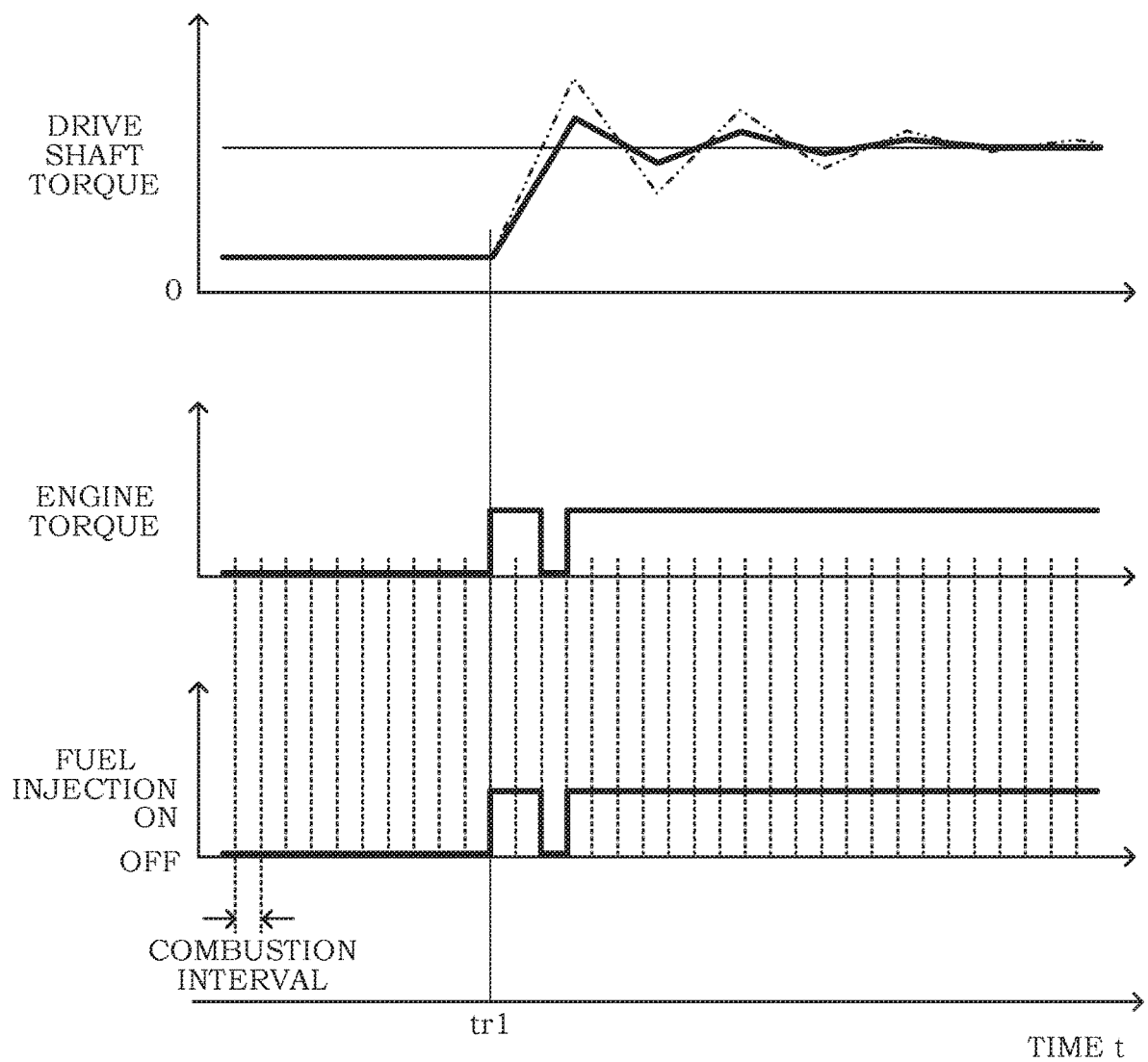
FIG. 13 illustrates an operation of the engine controller concerning the shock reducing injection control under reference conditions.

FIG. 13 shows effects that may be obtained according to the second embodiment under reference conditions (engine revolution speed: NEb2, reduction ratio: RTb2). In FIG. 13, the two-dot-dashed line indicates a drive shaft torque in a case where, after the restart of fuel supply (time tr1), fuel supply is continued without a temporary stop, without executing the restart time shock reducing injection control, and the solid line indicates the one in a case where the restart time shock reducing injection control is executed.

When fuel supply to the engine 1 is temporarily stopped, following the restart of fuel supply, by the restart time shock reducing injection control to decrease the engine torque in agreement with the positive peak in the fluctuation occurring in the drive shaft torque, an excessive increase of the drive shaft torque can be suppressed, and the torque shock can be reduced.

In the second embodiment, it has been configured such that the injection execute cylinder number Ncy1 and the injection stop cylinder number Ncy0 can both be set variably in accordance with the engine revolution speed NE and the reduction ratio RT.

Figure 14:
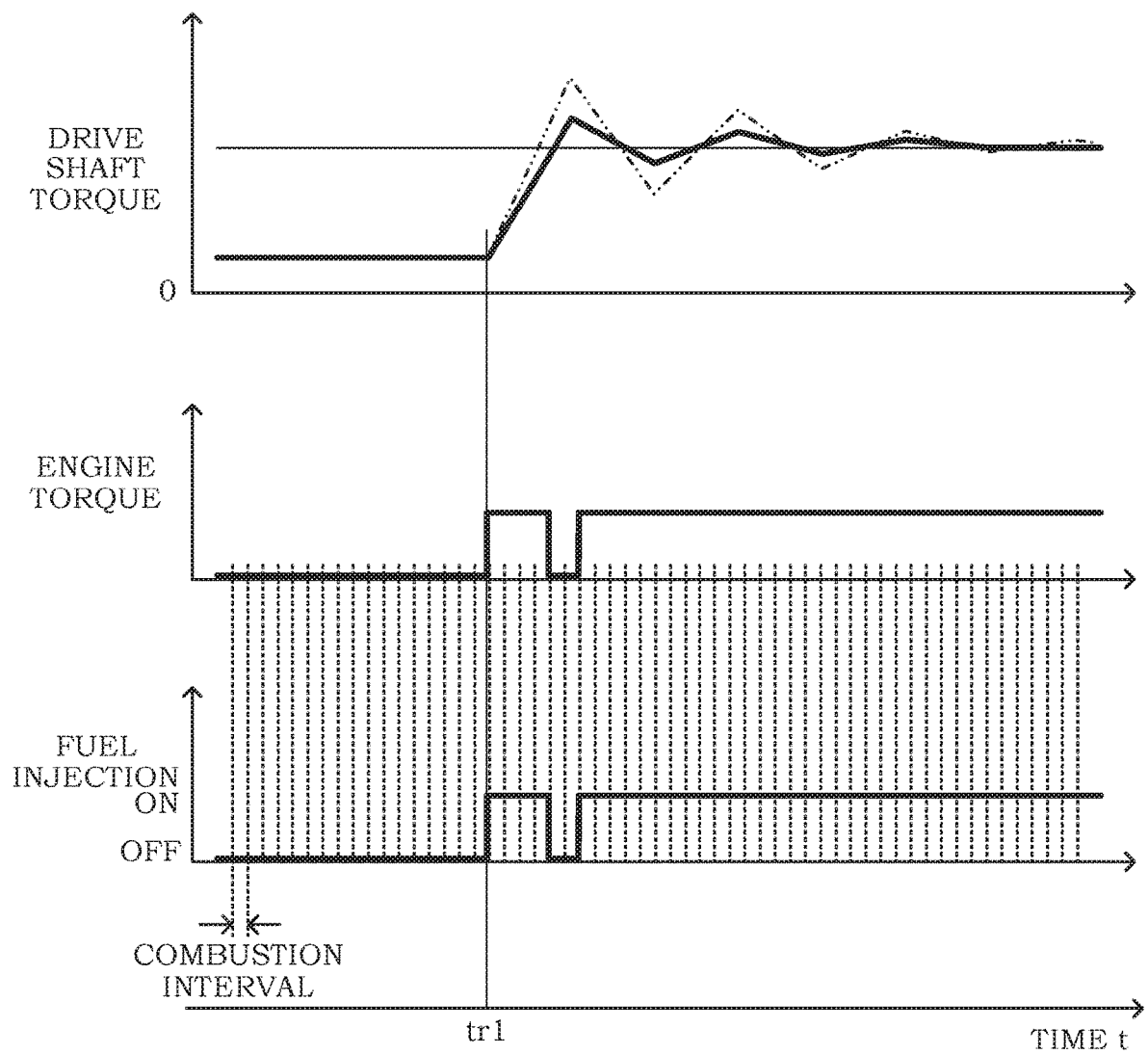
FIG. 14 illustrates an operation of the engine controller concerning the shock reducing injection control when the engine revolution speed is higher than in the reference conditions.

FIG. 14 illustrates a restart time shock reducing injection pattern which is set when the fuel cut recovery condition is fulfilled in a state where the engine revolution speed NE is higher (NE=2×NEb2) than in the reference conditions. Similarly as in FIG. 13, the two-dot-dashed line indicates a drive shaft torque in a case where no restart time shock reducing injection control is executed, and the solid line indicates the one in a case where the restart time shock reducing injection control is executed.

In the example shown in FIG. 14, with the increase of the engine revolution speed NE, the injection execute cylinder number Ncy1 and the injection stop cylinder number Ncy0 are increased (Ncy1=4, Ncy0=2) from the settings in the reference conditions. If the injection execute cylinder number Ncy1 and the injection stop cylinder number Ncy0 are kept at the settings in the reference conditions (Ncy1=2, Ncy0=1) despite the higher engine revolution speed NE, with the combustion interval (time) shortened, the engine torque will decease at a timing earlier than the positive peak in the fluctuation occurring in the drive shaft torque, and the engine torque will decrease only during a short period of time as compared to the period in which positive components are formed in the fluctuation of the drive shaft torque.

In contrast, when the injection execute cylinder number Ncy1 and the injection stop cylinder number Ncy0 are increased in response to the increase of the engine revolution speed NE, the engine torque can be decreased at an appropriate timing in agreement with the positive peak in the fluctuation occurring in the drive shaft torque, and the engine torque can be decreased over an appropriate period of time with respect to the period in which positive components are formed in the fluctuation of the drive shaft torque. It is therefore possible to more appropriately suppress the fluctuation of the drive shaft torque and reduce the torque shock.

Figure 15:
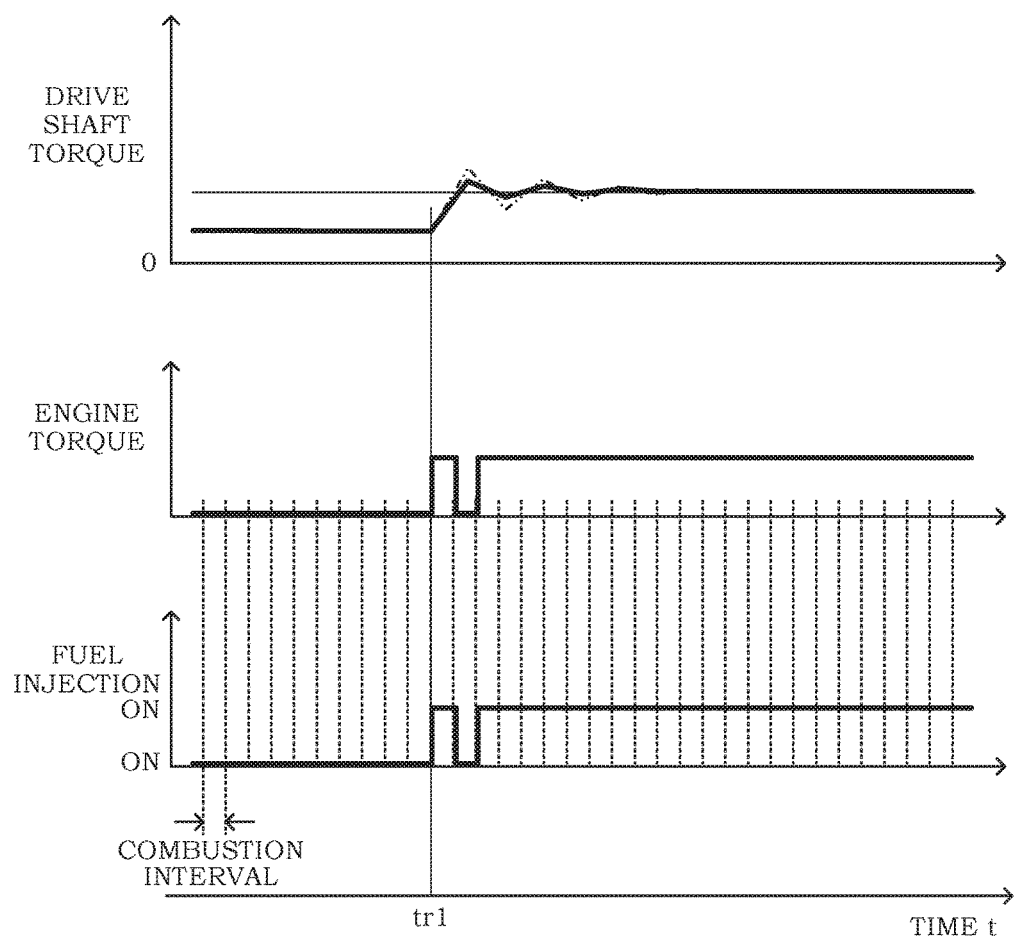
FIG. 15 illustrates an operation of the engine controller concerning the shock reducing injection control when the reduction ratio is lower than in the reference conditions.

FIG. 15 illustrates a restart time shock reducing injection pattern which is set when the fuel cut recovery condition is fulfilled in a state where the reduction ratio RT is lower (RT=RTb2/3) than in the reference conditions.

In the example shown in FIG. 15, while the injection stop cylinder number Ncy0 is kept at the setting (Ncy0=1) in the reference conditions, the injection execute cylinder number Ncy1 is decreased (Ncy1=1) in response to the decrease of the reduction ratio RT. If the injection execute cylinder number Ncy1 is kept at the setting (Ncy1=2) in the reference conditions despite the lower reduction ratio RT, with the shortened cycle of fluctuation of the drive shaft torque, the engine torque will decrease behind the positive peak in the fluctuation occurring in the drive shaft torque.

In contrast, when the injection execute cylinder number Ncy1 is decreased with the decrease of the reduction ratio RT to make the engine torque decreased at an earlier timing after the restart of the fuel supply, it is possible to reduce the engine torque at an appropriate timing in agreement with the positive peak in the fluctuation occurring in the drive shaft torque.

Further, while the amplitude of the drive shaft torque decreases with decreasing reduction ratio RT, if the injection stop cylinder number Ncy0 is kept at the setting in the reference conditions despite the decrease of the reduction ratio RT, the engine torque may decrease excessively, possibly causing unnecessary drop of the drive shaft torque.

In contrast, when the injection stop cylinder number Ncy0 is decreased in response to the decrease of the reduction ratio RT, the fluctuation of the drive shaft torque can be suppressed appropriately, and it is therefore possible to reduce the torque shock while securing a large enough drive shaft torque.

Although a description has been given above of embodiments of the present invention, the embodiments show only some application examples of the present invention, and are not intended to limit the technical scope of the present invention to the specific configurations in the embodiments.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A control method for an engine, comprising:
   determining whether a predetermined fuel supply stop condition has been fulfilled;
   executing stop time vibration suppression control of, after stop of fuel supply in response to fulfillment of the predetermined fuel supply stop condition, temporarily performing fuel supply to the engine to suppress vehicle vibration; and
   stopping fuel supply to all cylinders after the execution of the stop time vibration suppression control,
   wherein the stop time vibration suppression control comprises:
      determining whether a first predetermined number of cylinders have undergone a combustion stroke after the stop of the fuel supply, the first predetermined number being according to an engine revolution speed or a reduction ratio from the engine to drive wheels, and
      in a case where the first predetermined number of cylinders have undergone the combustion stroke, performing fuel supply to a second predetermined number of cylinders, and
   wherein the first predetermined number is:
      increased as the engine revolution speed is higher, and
      increased as the reduction ratio from the engine to the drive wheels is higher.

2. The engine control method according to claim 1,
   wherein the second predetermined number is
      increased as the engine revolution speed is higher, and
      increased as the reduction ratio from the engine to the drive wheels is higher.

3. The engine control method according to claim 1, further comprising:
   after the stop of the fuel supply, determining whether a predetermined fuel supply restart condition has been fulfilled;
   restarting fuel supply to the engine after fulfillment of the predetermined fuel supply restart condition;
   determining whether a third predetermined number of cylinders have undergone a combustion stroke after the restart of the fuel supply, the third predetermined number being according to the engine revolution speed or the reduction ratio from the engine to the drive wheels; and
   in a case where the third predetermined number of cylinders have undergone the combustion stroke, stopping fuel supply to a fourth predetermined number of cylinders,
   wherein the third predetermined number is:
      increased as the engine revolution speed is higher, and
      increased as the reduction ratio from the engine to the drive wheels is higher.

4. The engine control method according to claim 3,
   wherein the fourth predetermined number is:
      increased as the engine revolution speed is higher, and
      increased as the reduction ratio from the engine to the drive wheels is higher.

5. The engine control method according to claim 1, further comprising:
   after the stop of the fuel supply, determining whether a predetermined fuel supply restart condition has been fulfilled;
   restarting fuel supply to the engine after fulfillment of the predetermined fuel supply restart condition;
   determining whether a third predetermined number of cylinders have undergone a combustion stroke after the restart of the fuel supply; and
   in a case where the third predetermined number of cylinders have undergone the combustion stroke, stopping fuel supply to a fourth predetermined number of cylinders, the fourth predetermined number being according to the engine revolution speed or the reduction ratio from the engine to the drive wheels,
   wherein the fourth predetermined number is:
      increased as the engine revolution speed is higher, and
      increased as the reduction ratio from the engine to the drive wheels is higher.

6. A control method for an engine, comprising:
   determining whether a predetermined fuel supply stop condition has been fulfilled;
   executing stop time vibration suppression control of, after stop of fuel supply in response to fulfillment of the predetermined fuel supply stop condition, temporarily performing fuel supply to the engine to suppress vehicle vibration; and
   stopping fuel supply to all cylinders after the execution of the stop time vibration suppression control,
   wherein the stop time vibration suppression control comprises:
      determining whether a first predetermined number of cylinders have undergone a combustion stroke after the stop of the fuel supply, and
      in a case where the first predetermined number of cylinders have undergone the combustion stroke, performing fuel supply to a second predetermined number of cylinders, the second predetermined number being according to an engine revolution speed or a reduction ratio from the engine to drive wheels, and
   wherein the second predetermined number is:
      increased as the engine revolution speed is higher, and
      increased as the reduction ratio from the engine to the drive wheels is higher.

7. The engine control method according to claim 6, further comprising:
   after the stop of the fuel supply, determining whether a predetermined fuel supply restart condition has been fulfilled;
   restarting fuel supply to the engine after fulfillment of the predetermined fuel supply restart condition;
   determining whether a third predetermined number of cylinders have undergone a combustion stroke after the restart of the fuel supply, the third predetermined number being according to the engine revolution speed or the reduction ratio from the engine to the drive wheels; and
   in a case where the third predetermined number of cylinders have undergone the combustion stroke, stopping fuel supply to a fourth predetermined number of cylinders,
   wherein the third predetermined number is:
      increased as the engine revolution speed is higher, and
      increased as the reduction ratio from the engine to the drive wheels is higher.

8. The engine control method according to claim 7, wherein the fourth predetermined number is:
   increased as the engine revolution speed is higher, and
   increased as the reduction ratio from the engine to the drive wheels is higher.

9. The engine control method according to claim 6, further comprising:
   after the stop of the fuel supply, determining whether a predetermined fuel supply restart condition has been fulfilled;
   restarting fuel supply to the engine after fulfillment of the predetermined fuel supply restart condition;
   determining whether a third predetermined number of cylinders have undergone a combustion stroke after the restart of the fuel supply; and
   in a case where the third predetermined number of cylinders have undergone the combustion stroke, stopping fuel supply to a fourth predetermined number of cylinders, the fourth predetermined number being according to the engine revolution speed or the reduction ratio from the engine to the drive wheels,
   wherein the fourth predetermined number is:
   increased as the engine revolution speed is higher, and
   increased as the reduction ratio from the engine to the drive wheels is higher.

10. A control device for an engine, comprising:
    a fuel injection valve configured to supply fuel to the engine;
    an engine operating state sensor configured to detect an operating state of the engine; and
    an engine controller configured to control an engine torque on the basis of the operating state of the engine,
    wherein the engine controller comprises:
      a stop condition determining unit configured to determine whether a predetermined fuel supply stop condition has been fulfilled,
      a stop time vibration suppression controller configured to, after stop of fuel supply in response to fulfillment of the predetermined fuel supply stop condition, temporarily perform fuel supply to the engine to suppress vehicle vibration, and
      a fuel supply stopping unit configured to stop fuel supply to every cylinder by the fuel injection valve after the performance of the temporary fuel supply,
    wherein the stop time vibration suppression controller is configured to:
      determine whether a first predetermined number of cylinders have undergone a combustion stroke after the stop of the fuel supply, the first predetermined number being according to an engine revolution speed or a reduction ratio from the engine to drive wheels, and
      in a case where the first predetermined number of cylinders have undergone the combustion stroke, perform fuel supply to a second predetermined number of cylinders, and
    wherein the first predetermined number is:
    increased as the engine revolution speed is higher and
    increased as the reduction ratio from the engine to the drive wheels is higher.

11. A control device for an engine, comprising:
    a fuel injection valve configured to supply fuel to the engine;
    an engine operating state sensor configured to detect an operating state of the engine; and
    an engine controller configured to control an engine torque on the basis of the operating state of the engine,
    wherein the engine controller comprises:
      a stop condition determining unit configured to determine whether a predetermined fuel supply stop condition has been fulfilled,
      a stop time vibration suppression controller configured to, after stop of fuel supply in response to fulfillment of the predetermined fuel supply stop condition, temporarily perform fuel supply to the engine to suppress vehicle vibration, and
      a fuel supply stopping unit configured to stop fuel supply to every cylinder by the fuel injection valve after the performance of the temporary fuel supply,
    wherein the stop time vibration suppression controller is configured to
      determine whether a first predetermined number of cylinders have undergone a combustion stroke after the stop of the fuel supply, and
      in a case where the first predetermined number of cylinders have undergone the combustion stroke, perform fuel supply to a second predetermined number of cylinders, the second predetermined number being according to an engine revolution speed or a reduction ratio from the engine to drive wheels, and
    wherein the second predetermined number is:
    increased as the engine revolution speed is higher and
    increased as the reduction ratio from the engine to the drive wheels is higher.

* * * * *